US009753219B2

(12) United States Patent
Nadovich

(10) Patent No.: US 9,753,219 B2
(45) Date of Patent: Sep. 5, 2017

(54) OPTICAL COUPLER WITH FORKED GRATING STRUCTURE

(71) Applicant: Christopher T. Nadovich, Easton, PA (US)

(72) Inventor: Christopher T. Nadovich, Easton, PA (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 15/044,602

(22) Filed: Feb. 16, 2016

(65) Prior Publication Data

US 2016/0238787 A1    Aug. 18, 2016

Related U.S. Application Data

(60) Provisional application No. 62/115,668, filed on Feb. 13, 2015.

(51) Int. Cl.
| G02B 6/30 | (2006.01) |
| G02B 6/34 | (2006.01) |
| G02B 6/122 | (2006.01) |
| G02B 6/124 | (2006.01) |

(52) U.S. Cl.
CPC ........... *G02B 6/124* (2013.01); *G02B 6/1225* (2013.01); *G02B 6/1228* (2013.01); *G02B 6/30* (2013.01); *G02B 6/34* (2013.01)

(58) Field of Classification Search
CPC . G02B 6/30; G02B 6/34; G02B 6/124; G02B 6/1225; G02B 6/1228

USPC .................................. 385/14, 16, 24, 37–47
See application file for complete search history.

(56) References Cited

U.S. PATENT DOCUMENTS

| 5,218,584 | A | * | 6/1993 | Gfeller | G11B 7/0908 |
| | | | | | 369/112.27 |
| 5,226,100 | A | * | 7/1993 | Maerz | G02B 6/12011 |
| | | | | | 359/569 |
| 6,530,697 | B1 | * | 3/2003 | Johnson | G02B 6/29311 |
| | | | | | 385/33 |
| 7,619,739 | B1 | * | 11/2009 | Sutherland | G01N 21/774 |
| | | | | | 356/432 |
| 8,494,315 | B2 | * | 7/2013 | Dupuis | B29D 11/00663 |
| | | | | | 385/14 |
| 9,028,157 | B2 | * | 5/2015 | Na | G02B 6/12 |
| | | | | | 385/37 |

(Continued)

*Primary Examiner* — Akm Enayet Ullah
(74) *Attorney, Agent, or Firm* — Bond, Schoeneck & King, PLLC; Blaine Bettinger; George McGuire

(57) ABSTRACT

A device and system for coupling light into and out of a photonic integrated circuit. The forked grating coupler device applies a forked grating structure to the design of the diffracting lines in an integrated optics grating coupler to make the device compatible with vortex light beams to or from free space, bulk optics, or special optical fiber that can propagate vortex modes. These diffracting lines, which can be grooves, or ridges, or a photonic metamaterial discontinuity arranged in a continuous or intermittent curve, follow the forked diffraction pattern lobes over a two-dimensional surface. The resulting device can therefore absorb or radiate a vortex beam mode at near-normal incidence to a PIC and transform that vortex mode to a transverse electric (TE) or transverse magnetic (TM) waveguide mode traveling along a slab or strip optical waveguide parallel to the surface of the IC.

16 Claims, 10 Drawing Sheets

(56) References Cited

U.S. PATENT DOCUMENTS

| | | | |
|---|---|---|---|
| 9,103,975 B2 * | 8/2015 | Yu ................... | G02B 6/12007 |
| 9,162,404 B2 * | 10/2015 | Doerr ............... | B29D 11/00663 |
| 9,316,800 B1 * | 4/2016 | Celo .................. | G02B 6/4249 |
| 2006/0065640 A1 * | 3/2006 | Lizotte .............. | B23K 26/0604 |
| | | | 219/121.61 |
| 2013/0277331 A1 * | 10/2013 | Dupuis ............ | B29D 11/00663 |
| | | | 216/24 |
| 2015/0249321 A1 * | 9/2015 | Chen ................. | H01S 5/2054 |
| | | | 372/45.01 |
| 2015/0309261 A1 * | 10/2015 | Kobyakov ......... | G02B 6/305 |
| | | | 385/14 |

* cited by examiner

OPTICAL COUPLER WITH FORKED GRATING STRUCTURE

CROSS-REFERENCE TO RELATED APPLICATIONS

This application claims priority to U.S. Provisional Patent Application Ser. No. 62/115,668, filed on Feb. 13, 2015, the entire disclosure of which is incorporated herein by reference.

GOVERNMENT FUNDING

This invention was made with Government support under the National Science Foundation Award IIP1068040. The United States Government has certain rights in the invention.

FIELD OF THE INVENTION

The present disclosure is directed generally to an optical device and system for coupling light into and out of photonic integrated circuits.

BACKGROUND

Wavefronts can contain dislocation lines, closely analogous to those found in imperfect crystals. Surrounding these dislocations, the wave field can have interesting properties. For example, optical vortex ("OV") beams contain a wavefront phase singularity in their center. Such beams can propagate in free space or in special kinds of optical fiber waveguide. OV beams have a variety of potential applications in many areas, including particle manipulation, micro fabrication, and optical communications. OV beams are characterized by helical phase fronts, a null central intensity, and the ability to convey internal optical orbital angular momentum (OAM).

An important characteristic of these beams is an azimuthal phase dependence $e^{i\chi\phi}$ where $\phi$ is the azimuthal angle about the beam, and $\chi$ represents the overall topological charge of the internal Orbital Angular Momentum (OAM) of the beam. As a consequence of this helical phase, the phase front has a screw dislocation in the center of the beam. E fields cancel at this point giving rise to so called "donut modes" with zero intensity centers and singular phase.

One of the specific advantages possessed by OV beams for use in communications is that they can be described as the superposition of infinite set of mutually orthogonal propagating modes that are independent of polarization and wavelength. As these orthogonal OAM modes are parameterized by the distinct integer "topological charge" that can vary without theoretical limit, exploiting OAM can multiply the number of available channels in optical communications multiplexing above and beyond what is available with wavelength and polarization multiplexing.

Technology for connecting external photonic signals, free space or fiber-guided light beams, to a Photonic IC (PIC) is not quite as straightforward as connecting external electronic signals carried by copper PCB traces to ordinary electronic ICs. Existing fiber-to-PIC interface options include lens focusing, end-butt fiber coupling, prism couplers, tapered couplers, and grating ("Bragg") couplers. Bragg couplers couple light near vertically in and out of the optical slab or film waveguides of integrated optics. The near vertical coupling of a grating coupler provides physical flexibility in placing the optical interface anywhere on the chip surface. As such, a grating coupler represents an analogous optical bond pad on the PIC where a fiber conveniently could be butt-coupled, or a free-space beam could be focused. This allows increasing the density of optical interfaces and preserves the chip edge to be used for low- and high-speed electronic signal pads.

However, there remains a continued need in the art for more efficient and adaptable devices and systems for coupling light into and out of photonic integrated circuits.

SUMMARY OF THE INVENTION

The present disclosure describes a device and system for coupling light into and out of a photonic integrated circuit. According to an embodiment, the forked grating coupler device applies a forked grating structure to the design of the diffracting lines in an integrated optics grating coupler to make the device compatible with vortex light beams to or from free space, bulk optics, or special optical fiber that can propagate vortex modes. These diffracting lines, which can be grooves, or ridges, or a photonic metamaterial discontinuity arranged in a continuous or intermittent curve, follow the forked diffraction pattern lobes over a two-dimensional surface. The positions of the diffracting lines in the forked grating are computed by a computer algorithm.

The forked grating coupler device can be used to couple normal or near-normal incident optical vortex beams into confined slab waveguide modes. Similarly, the grooved, ridged, metamaterial, or multilayer metamaterial grating structure transforms a vector polarized, circular, azimuthal, or radially polarized beam into a basic TE or TM slab waveguide mode. The forked grating in the coupler can be curved to drastically shorten the adiabatic taper length required to interface with a photonic integrated circuit strip waveguide wire. Additionally, a coating over top of the forked grating structure improves efficiency. Among other advantages, the device is compatible with integrated optics fabrication processes on silicon or other materials, and with the CMOS process, forked grating couplers can be placed freely on a photonic integrated circuit. The forked grating structure is low-profile and occupies little area.

According to an aspect is an optical coupler configured to couple an incident optical vortex light beam to or from a waveguide mode. The optical coupler includes: (i) a forked grating structure configured to receive the optical vortex light beam; (ii) an optical waveguide; and (iii) a tapered portion connecting the forked grating structure and the optical waveguide.

According to an embodiment, the optical vortex light beam is in free space, received from an optic, or received from an optical fiber.

According to an embodiment, the forked grating structure comprises at least one forked region and a plurality of grooves.

According to an embodiment, each of the plurality of grooves comprise a constant width.

According to an embodiment, the at least one forked region is positioned amidst the plurality of grooves.

According to an embodiment, at least some of the plurality of grooves are segmented.

According to an embodiment, the coupler comprises at least two optical waveguides and at least two tapered portions.

According to an embodiment, the optical coupler further includes a reflector.

According to an embodiment, the at least one forked region is coated.

According to an aspect is an optical coupling system configured to couple an incident optical vortex light beam to or from a waveguide mode. The system includes an optical coupler having: (i) a forked grating structure configured to receive the optical vortex light beam; (ii) an optical waveguide; and (iii) a tapered portion connecting the forked grating structure and the optical waveguide; and a photonic integrated circuit configured to receive light from the optical coupler.

According to an embodiment, the system includes an optic configured to provide the light beam to the optical coupler.

According to an embodiment, the system includes an optical fiber configured to provide the light beam to the optical coupler.

According to an embodiment, the forked grating structure comprises at least one forked region and a plurality of grooves. According to an embodiment, each of the plurality of grooves comprises a constant width.

According to an embodiment, the at least one forked region is positioned amidst the plurality of grooves.

According to an embodiment, at least some of the plurality of grooves are segmented.

According to an embodiment, the coupler comprises at least two optical waveguides and at least two tapered portions.

According to an embodiment, the system includes a reflector.

According to an embodiment, the at least one forked region is coated.

These and other aspects of the invention will be apparent from the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

The present disclosure describes a device and system for coupling light into and out of a photonic integrated circuit. According to an embodiment, the forked grating coupler device applies a forked grating structure to the design of the diffracting lines in an integrated optics grating coupler to make the device compatible with vortex light beams to or from free space, bulk optics, or special optical fiber that can propagate vortex modes. These diffracting lines, which can be grooves, or ridges, or a photonic metamaterial discontinuity arranged in a continuous or intermittent curve, follow the forked diffraction pattern lobes over a two-dimensional surface. The position of the diffracting lines in the forked grating can be computed by a computer algorithm. The resulting device can therefore absorb or radiate a vortex beam mode at near-normal incidence to a PIC and transform that vortex mode to a transverse electric (TE) or transverse magnetic (TM) waveguide mode traveling along a slab or strip optical waveguide parallel to the surface of the IC. The device may also be used to select certain vortex modes that possess a particular OAM charge and reject other charges, among many other uses.

Figure 1:
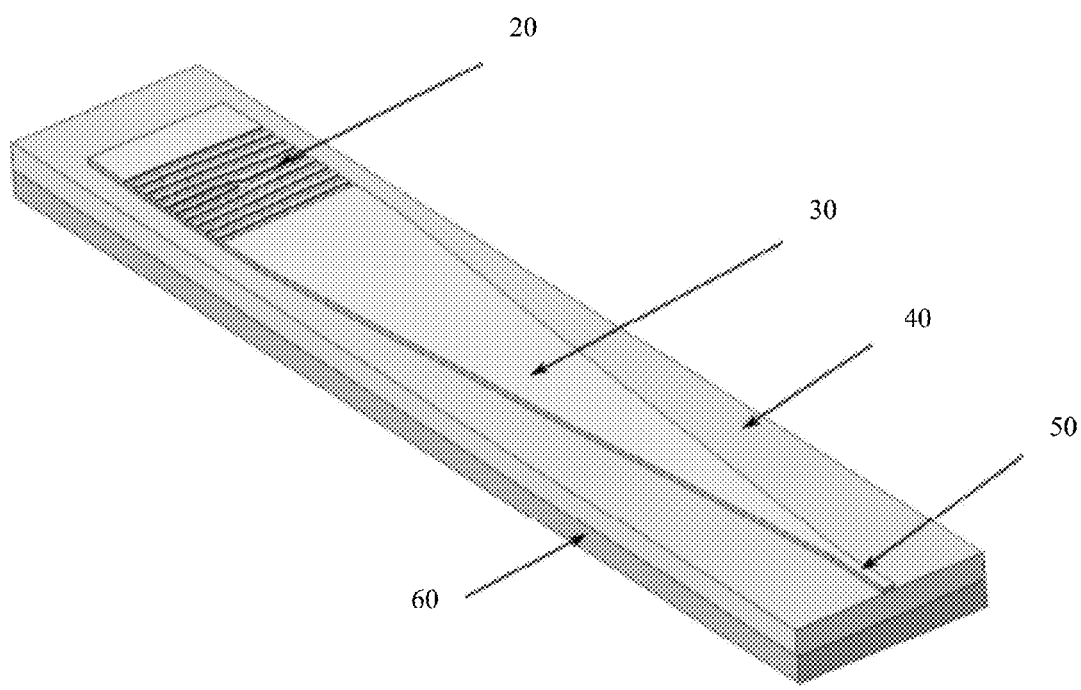
FIG. 1 is a schematic representation of a forked grating coupler device, in accordance with an embodiment.

Referring now to the drawings, wherein like reference numerals refer to like parts throughout, there is seen in FIG. 1, in one embodiment, a forked grating coupler device 10. The forked grating coupler device includes a forked holographic grating structure 12. The device also includes a feed taper 30 and feed waveguide 50. According to an embodiment, the structure can comprise a substrate material 40 and a carrier 60.

Figure 2:
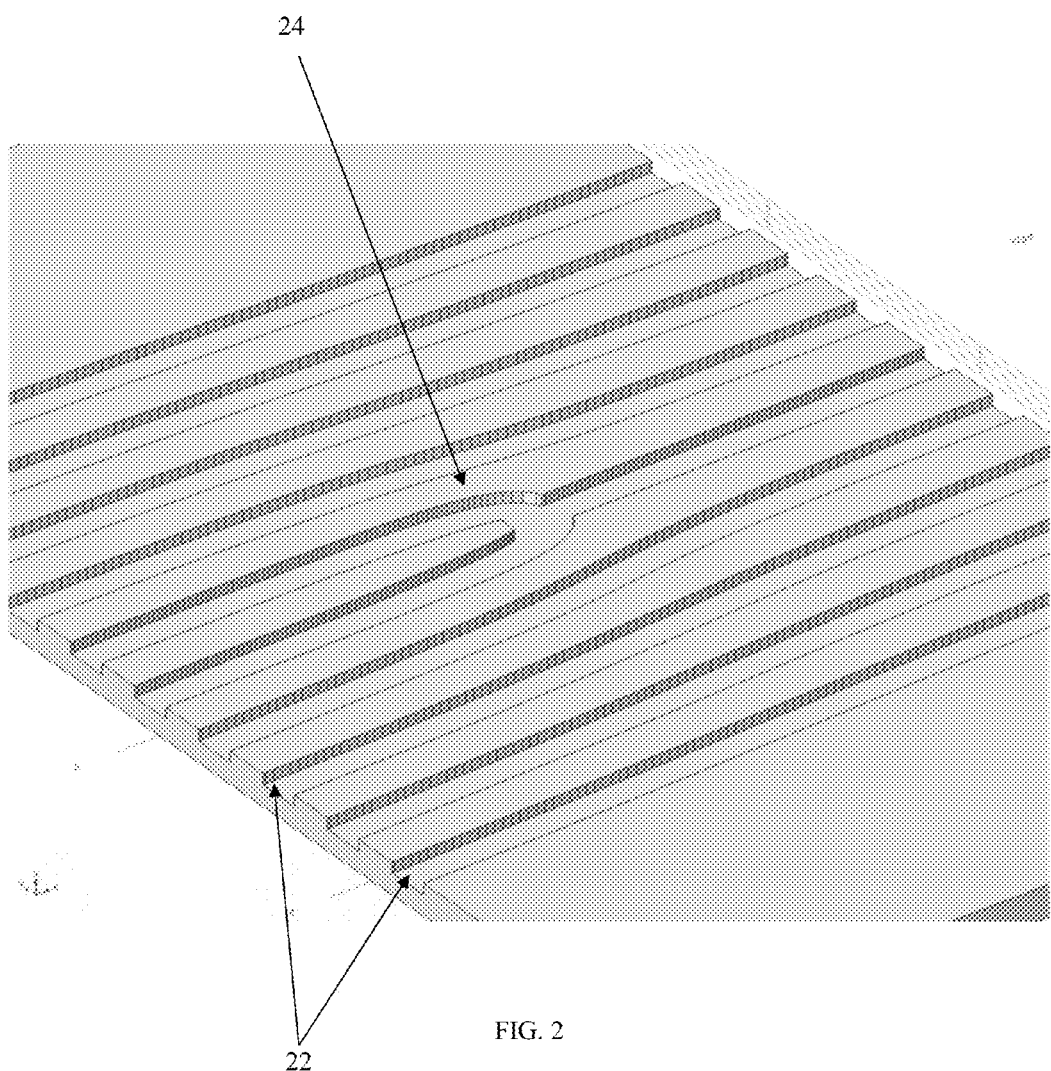
FIG. 2 is a schematic representation of a forked grating of a forked grating coupler device, in accordance with an embodiment.

Referring to FIG. 2, in one embodiment, is an example forked holographic grating structure 12 with constant-width grooves 22 and a forked region 24.

According to an embodiment, the forked grating coupler device 10 could be utilized with the feed waveguide 50, feed taper 30, and the main portion of the forked grating 20 acting in a slab waveguide mode with optimized thickness of high dielectric material such as silicon over a wider substrate 40 of lower dielectric material such as silicon dioxide, above a carrier material 60 that could be, for example, a silicon wafer. For example, according to one embodiment the waveguide 50, feed taper 30, and forked grating 20 could be composed of approximately 220 nm, the substrate material 30 could be silicon of approximately 1-2 μm, although many other thicknesses are possible, and the carrier material 60 could be a silicon wafer. For example, a top device layer of silicon can be etched away around the perimeter of the device, leaving the buried oxide (SiO$_2$) exposed as an outline. This outlining etch defines the input/output photonic wire waveguide, such as a 450×220 nm waveguide among many other sizes, that tapers up through an adiabatic structure approximately 500 μm long to a 12 μm wide slab waveguide. Once again, a variety of different sizes and materials are possible. On the wide slab the grating could be etched.

Figure 3:
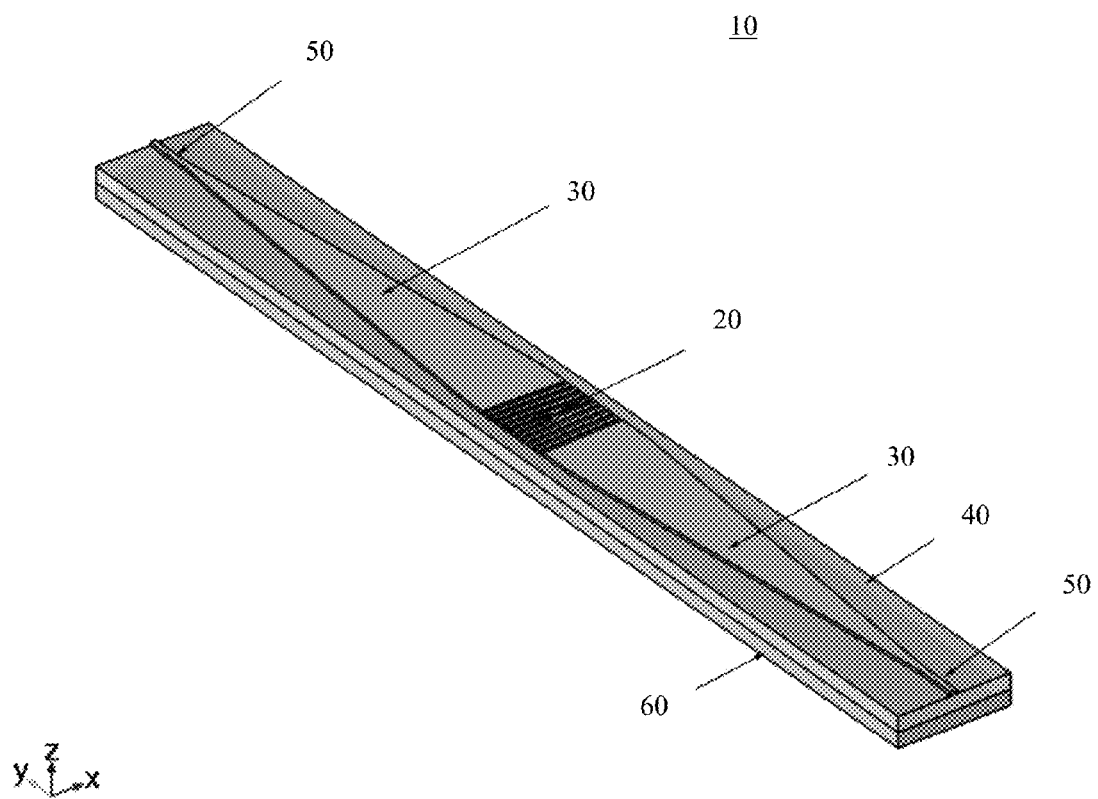
FIG. 3 is a schematic representation of a forked grating coupler device, in accordance with an embodiment.

Referring to FIG. 3, in one embodiment, is a forked holographic grating structure 12 with two feed tapers 30 and feed waveguides 50. A dual taper design allows the device to split apart vortex beams containing two opposite charges into simple TM or TE light in separate waveguides, and can also be utilized to combine TM or TE light from separate waveguides into a single vortex beam containing two opposite charges.

According to the embodiment shown in FIG. 3, a second taper 30 is added on the other side of the grating, as compared to FIG. 1. The second taper allows a second waveguide interface 50. The two waveguide interfaces couple to opposite vortex OAM charges, +X and −X, for a forked grating designed with charge X. When the forked grating structure 12 with a dual taper is used as an emitter, the two waveguide interfaces at the ends of the tapers are inputs for separate sources of light in the waveguides. The two sources are combined into a single vortex light beam emitted from the grating. This vortex beam has two simultaneous charges multiplexed onto the single beam. Thus the forked grating structure 12 with dual taper and two waveguide interfaces can be used as a vortex beam multiplexing combiner.

Similarly, when the forked grating structure 12 with dual taper is used as a detector, the two waveguide interfaces at the ends of the tapers are outputs for separate destinations of light in the waveguides. When a vortex light beam that contains two simultaneous vortex OAM charges, +X and −X, for a forked grating designed with charge X, is incident on the grating, the light will be de-multiplexed into two beams that are directed out the two tapered waveguide interfaces.

Figure 4:
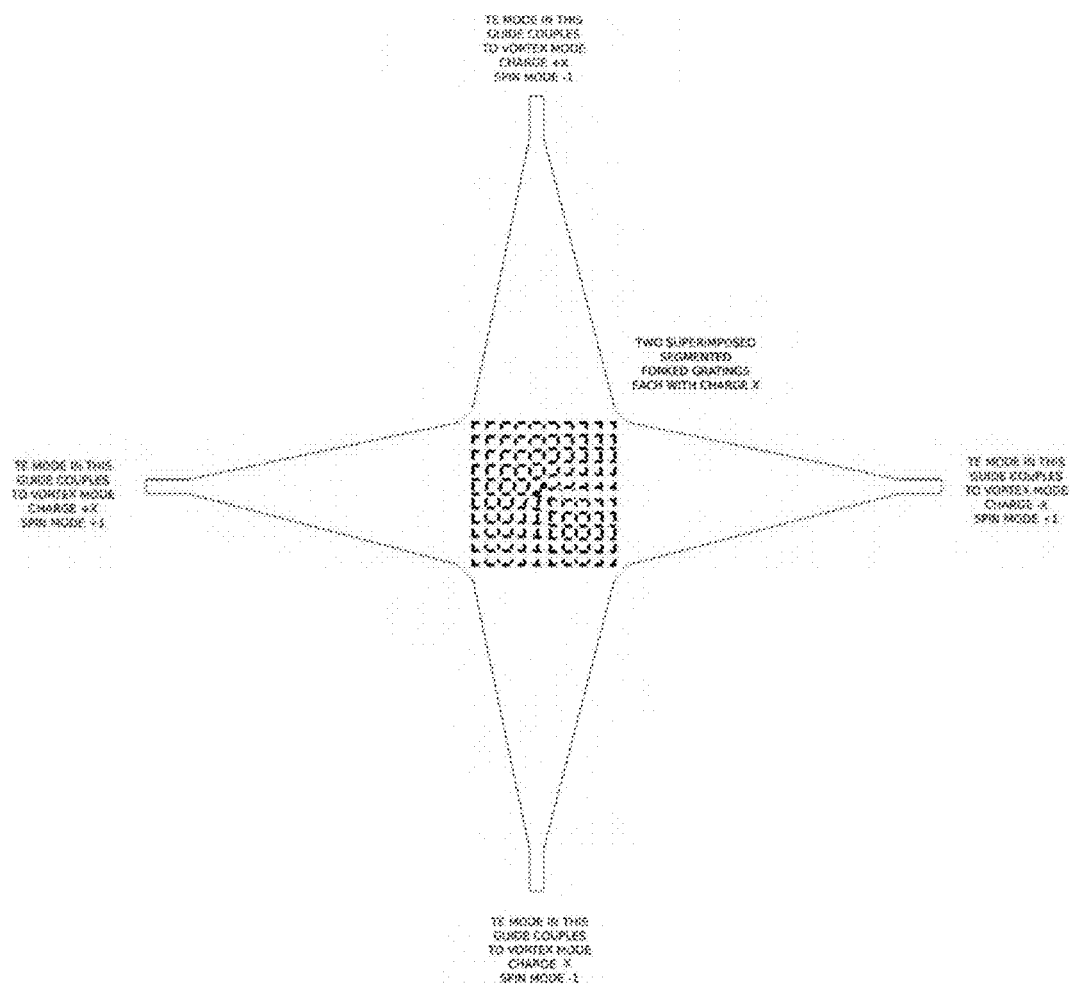
FIG. 4 is a schematic representation of a forked grating coupler device, in accordance with an embodiment.
Figure 5A:
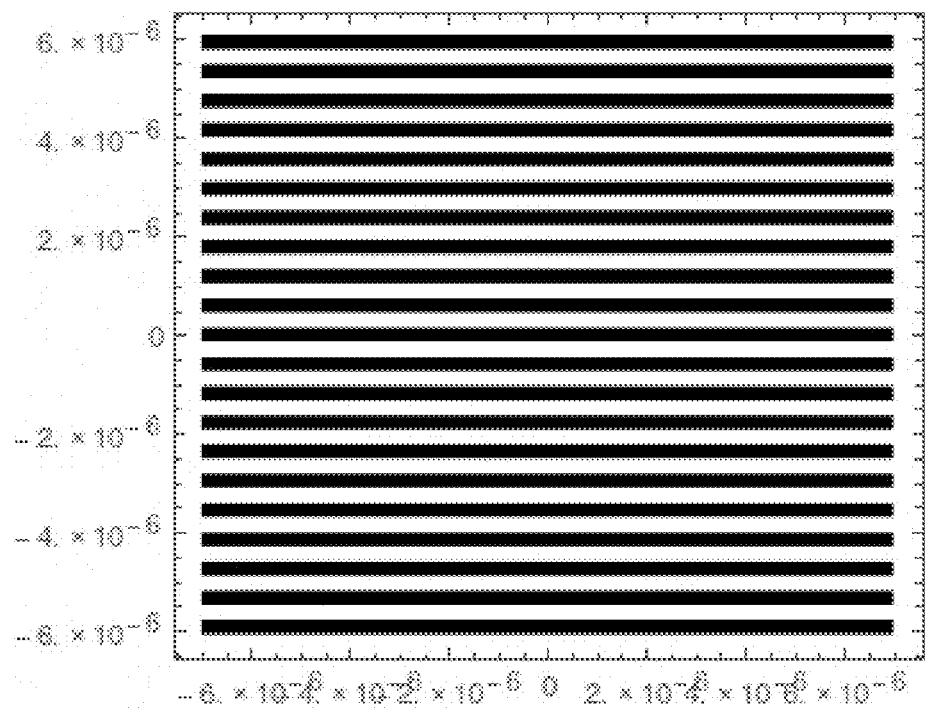
FIG. 5A is a schematic representation of a non-forked grating, in accordance with an embodiment.
Figure 5B:
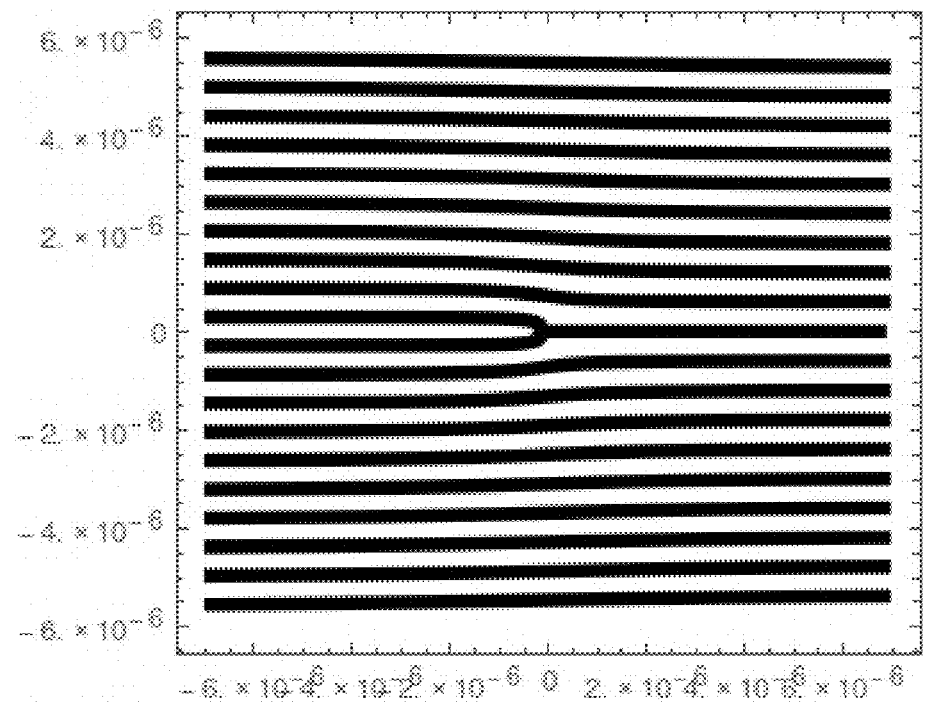
FIG. 5B is a schematic representation of a forked grating, in accordance with an embodiment.
Figure 5C:
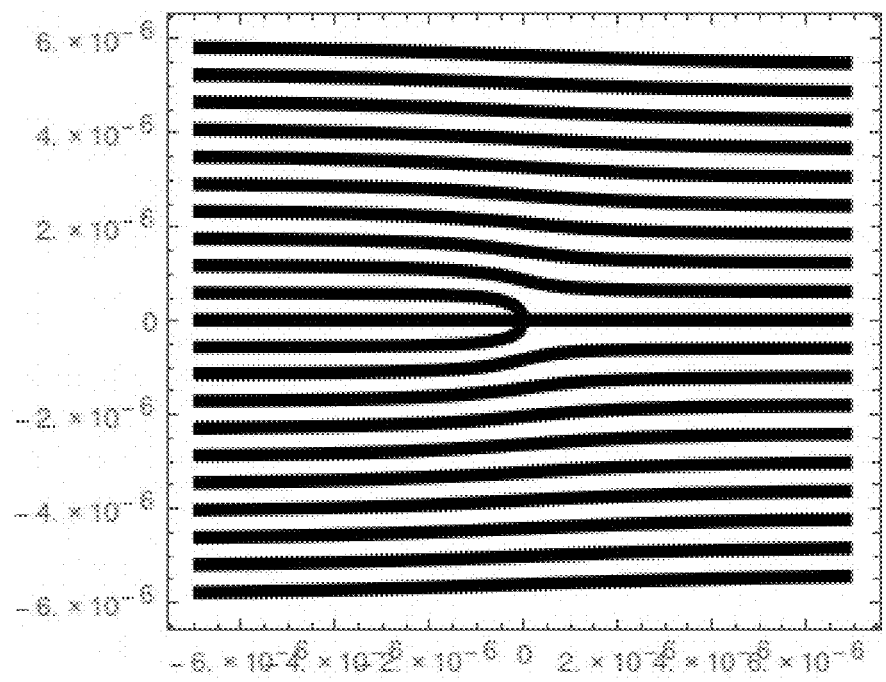
FIG. 5C is a schematic representation of a forked grating, in accordance with an embodiment.
Figure 5D:
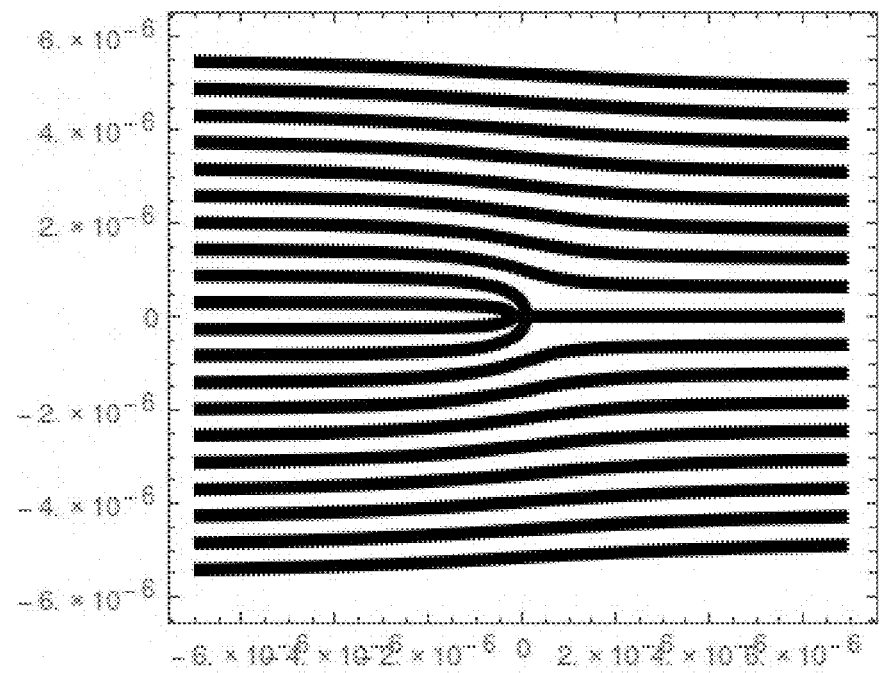
FIG. 5D is a schematic representation of a forked grating, in accordance with an embodiment.

In addition to dual tapers, multiple tapers can be provided, adding additional waveguide interfaces. For example, forked grating structures with four or more tapers and waveguide interfaces are possible, as shown in FIG. 4.

According to an embodiment, a computer algorithm that can compute the positions of the diffracting lines in the grating can be based on a phase match between the TE or TM propagating mode captured in the slab waveguide and the vortex mode near normal to the slab. For a forked grating that selects vortex charge $\chi$ that is not curved or otherwise optimized, the m'th line of the grating is the solutions to a transcendental equation:

$$\beta_{\it eff}\, y + 2\pi m = \chi \tan^{-1} \frac{y\cos\theta}{x} + ky\sin\theta \qquad \text{(Eq. 1)}$$

where $\beta_{\it eff}$ is the effective propagation constant for the waveguide mode propagating in the negative y direction. The OV beam is incident at angle $\theta$ in the x-y plane. The constant k is the free space wavenumber.

In general, for all x,y the above transcendental equation can only be solved numerically. Along the x axis, y=0, and the multivalued inverse tangent function is zero on the positive x axis, and is $\pi$ on the negative x axis. Therefore, for values of $\chi$ that are even integers, the positive x axis will be a solution, but the negative x axis will not. For odd values of $\chi$ the whole x axis is a solution. Thus, for odd charge, the gratings will have a half line at the origin; for even charges (and zero) there will be a full grating line through the origin.

To control aperture amplitude taper (apodization) it will be necessary to change the width, depth, or shape of grating lines. Altering the grating alters the effective propagation constant under the grating. Therefore, in general, $\beta_{\it eff}$ is not a constant, but is a function of y, or $\beta_{\it eff}(y)$. Thus, the equation for the grating line location computation becomes:

$$\int_0^y \beta_{\it eff}(u)\,du + 2\pi m = \chi \tan^{-1} \frac{y\cos\theta}{x} + ky\sin\theta \qquad \text{(Eq. 2)}$$

The width of the grating lines can be varied to change $\alpha$, the attenuation constant, as a function of y in order to achieve a desired upward illumination pattern $R_{up}(y)$ under the constraint of the input power, P(y=0), and the remaining thru power, P(y=L) at the end of a grating of length L. The required $\alpha$ to achieve this is given by the expression:

$$\alpha(y) = \frac{1}{2} \frac{R_{up}(y)}{\frac{P(0)}{P(0)-P(L)} \int_0^L R_{up}(u)\,du - \int_0^y R_{up}(u)\,du} \qquad \text{(Eq. 3)}$$

The position of the grating lines can be computed by routine numerical techniques to satisfy Eq. 2 and the width of the grating lines can be similarly computed to satisfy Eq. 3. The position and width of the lines thus computed can be converted directly to a standard photolithography artwork file format such as GDS or DXF. Such a file can be used by standard photolithography tools, such as mask makers for optical lithography, or electron-beam lithography tools for electron beam lithography. These lithography tools can use the file artwork data describing the forked grating coupler in conjunction with other layout artwork describing the rest of the photonic IC, including other optical and electronic components. The combined artwork can be used to pattern and etch wafers of silicon or other materials to fabricate a photonic IC that contains integrated forked grating coupler interfaces.

According to an embodiment, to optimize performance a conductive mirror or multilayer reflector could be placed between the substrate 40 and the carrier 60. The forked grating structure 10 could be width- or depth-modulated grooves, ridges, metal bars, or other deposited material, or apertures in some material deposited over the substrate, or a multilayer complex metamaterial structure optimized for polarization matching or aperture apodization that creates the curved regions of the forked grating to couple between the normal or near-normal incident optical vortex wave components and a simple fundamental TE or TH wave confined through the taper into the feed waveguide 50 photonic wire. A coating or thickening of material or metamaterial might be applied overtop the forked grating 20 to improve efficiency or facilitate polarization matching.

Forked gratings are designed to interface with any integer vortex charge $\chi = \ldots -2, -1, 0, 1, 2, \ldots$. Example designs for forked gratings for charges 0, 1, 2, and 3 are shown in FIGS. 5A, 5B, 5C, and 5D, respectively (where units are in meters). Designs for negative charges −0, −1, −2, and −3 are produced by rotating these positive charge designs 180 degrees. These designs are specifically crafted by the given algorithm for implementation in silicon waveguide 12 um wide by 220 nm thick with grooves 25 nm deep. The vortex beam in these designs is tilted 8 degrees from normal. Other tilt angles, groove depths, sizes, and materials are designed by the same algorithm in a similar way.

Figure 6:
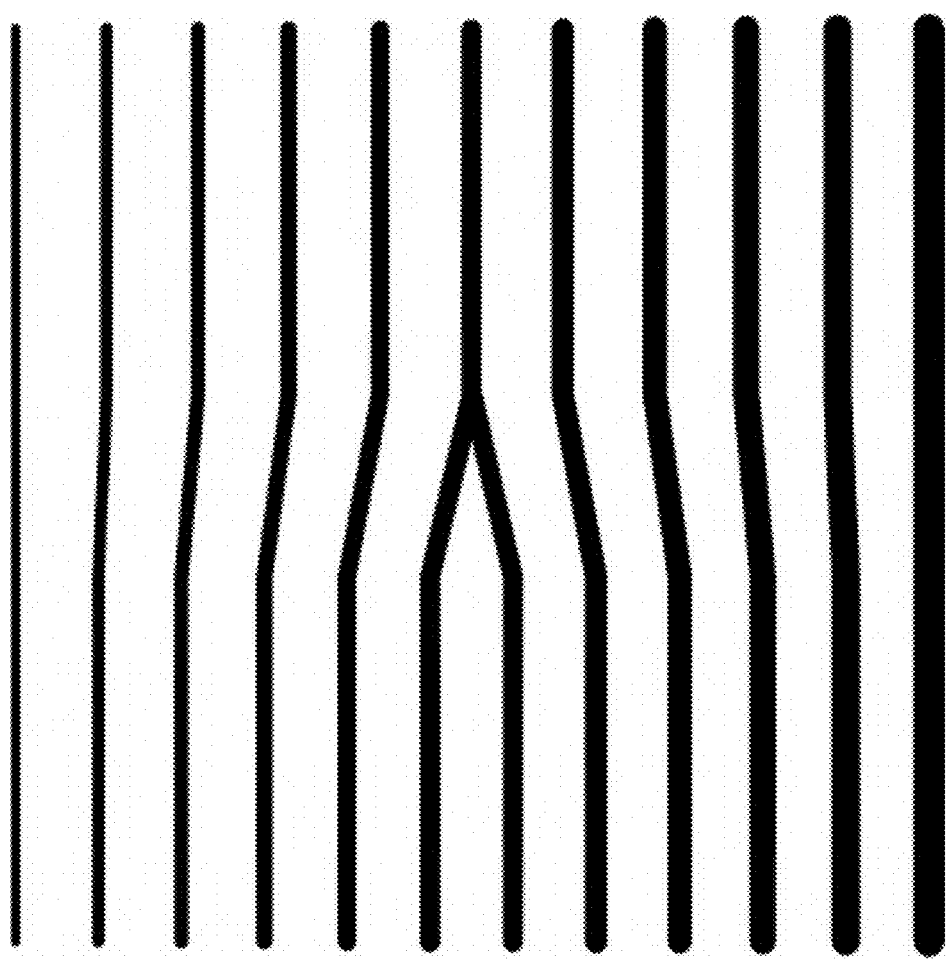
FIG. 6 is a schematic representation of a forked grating with variable line width, in accordance with an embodiment.

For examples, it is possible to design forked gratings with variable linewidth so as to better control the amplitude distribution of the vortex. Uniform amplitude as well as other amplitude tapers are achievable subject to constraints on efficiency. Forked gratings with variable groove width are called apodized forked gratings. An example of an apodized forked grating is shown in FIG. 6A.

Figure 7:
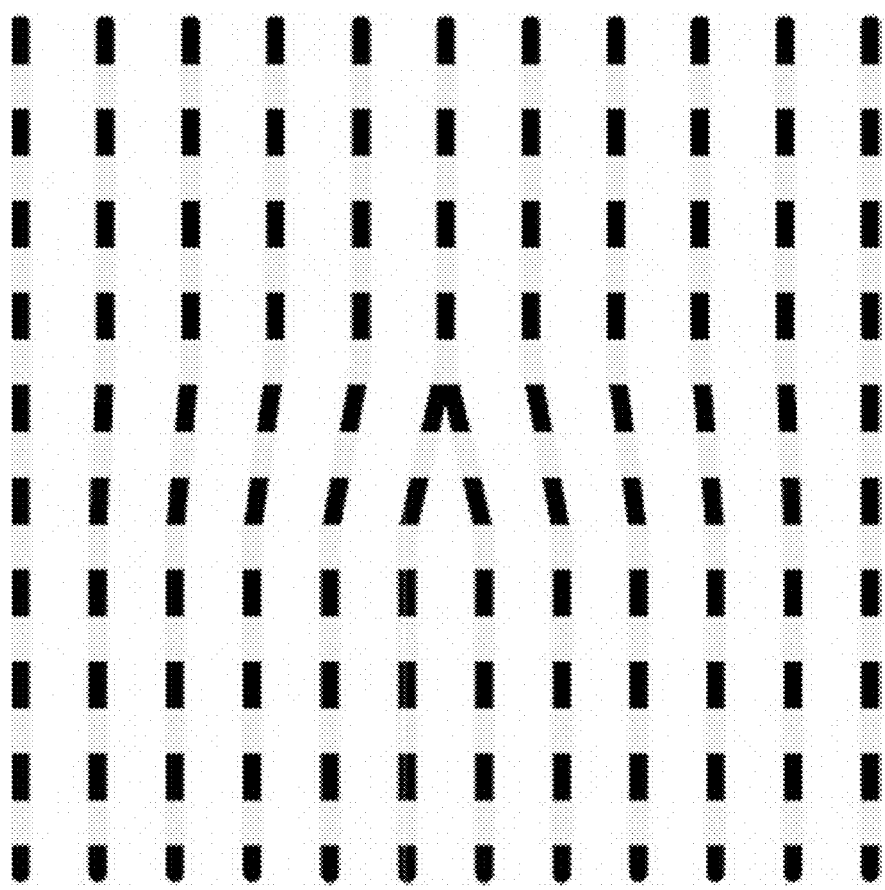
FIG. 7 is a schematic representation of a forked grating with segmented grooves, in accordance with an embodiment.

It is also possible, according to an embodiment, to create forked gratings that have segmented grooves. Using discontinuous segmented grooves has the advantage of providing more flexibility in the way the light interacts with the grating. For example, groove segments can be designed to favor one polarization (spin) mode over another. A variety of segment shapes is possible, including rectangles, plus (+) shapes, circles (posts), as well as chiral metamaterial "atomic" shapes that interact with light in a selective manner. Grating segmentation can also accomplish apodization similarly to varying groove width can accomplish apodization. An example non-apodized grating that is segmented with dashed rectangles favoring TE polarized light propagating horizontally is shown in FIG. 7.

According to an embodiment, the forked grating coupler can be used either as a detector of optical vortex beams or as an emitter of optical vortex beam. The taper region 30 can be shortened by warping the forked grating to focus the waves in a shortened distance to the feed 50, among other variations.

Example—Simulation

Figure 8:
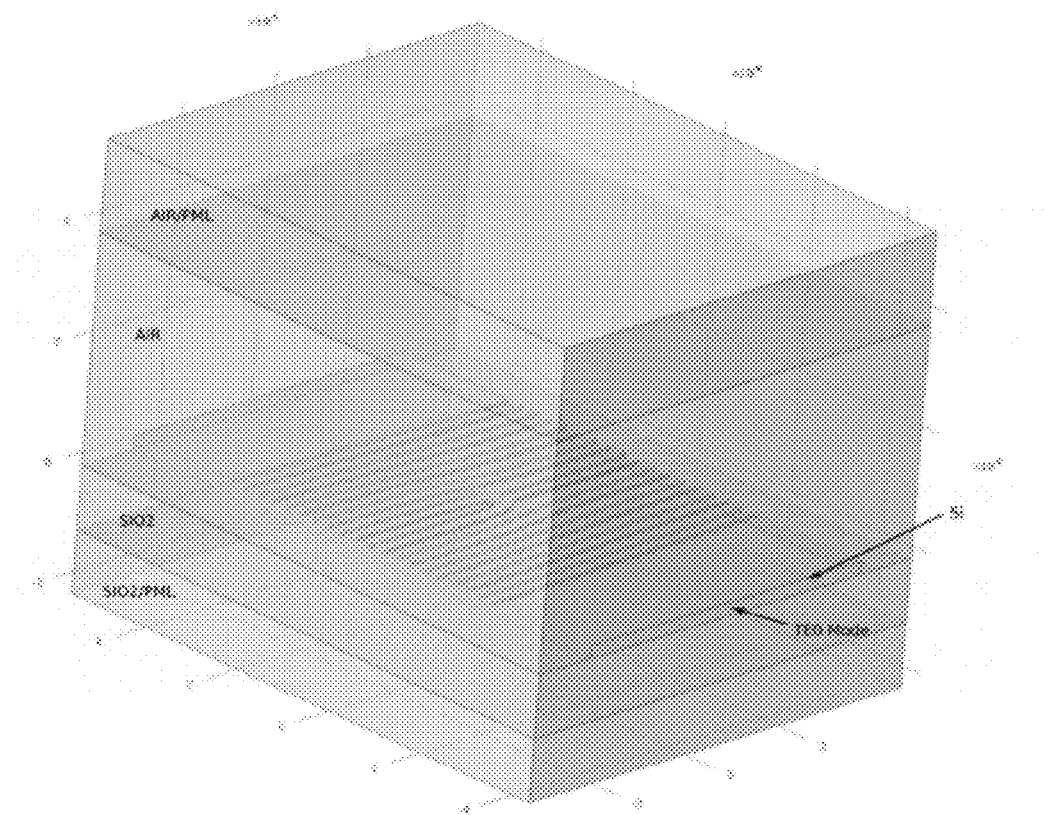
FIG. 8 is a schematic representation of a simulation model, in accordance with an embodiment.

Finite element method electromagnetic analysis was performed using COMSOL Multiphysics software with the Electromagnetic Waves, Frequency Domain physics. The geometry of the model simulated is shown in FIG. 8. According to an embodiment, a 220 nm high, 5.8 um wide, 10 um long silicon strip waveguide (index 3.44) on a substrate of $SiO_2$ (index 1.45) was driven from the negative y end (port 1) with a TE0 mode. Port 2 was not driven. A 4 μm thickness of air, and 1 μm of PML/Air was above the waveguide. The substrate was a 1.3 μm thickness of $SiO_2$ over an equal 1.3 μm thickness of $PML/SiO_2$. Side walls were PEC. Port walls were numeric ports that are perfectly absorbing only for the TE0 mode calculated. The forked grating grooves were 75 nm deep.

According to an embodiment, the structure of the forked grating grooves was calculated with a math tool (Mathematica) based on the algorithm provided above. The grating groove solution was exported from the tool as a DXF file containing sets of line segments that form closed loops outlining the perimeter of each groove. It was possible to import these lists of closed, segmented curves into a COMSOL 2D workplane geometry, which COMSOL recognizes as distinct polygons. Once the polygonal grooves are imported, they are extruded by their physical depth (in this case 75 nm) into the 3D structure of the forked grating. This extruded structure is subtracted from a slab of silicon so as to virtually "etch" the grating grooves into the material.

Both TE and TM modes are supported by the 12 um×220 nm Si waveguide. The TE mode of the Si waveguide has been modeled exclusively thus far. Nevertheless, an equivalent TM Forked Grating Coupler structure can be designed in exactly the same way with grating pitch dimensions scaled in proportion to the different optical index for the TM mode. A boundary mode analysis calculation defines the mode field distribution of the waveguide at the input and output waveguide ports defining the side boundaries. One of these ports is driven by an incident wave, and the other port has no incident power injected.

Figure 9:
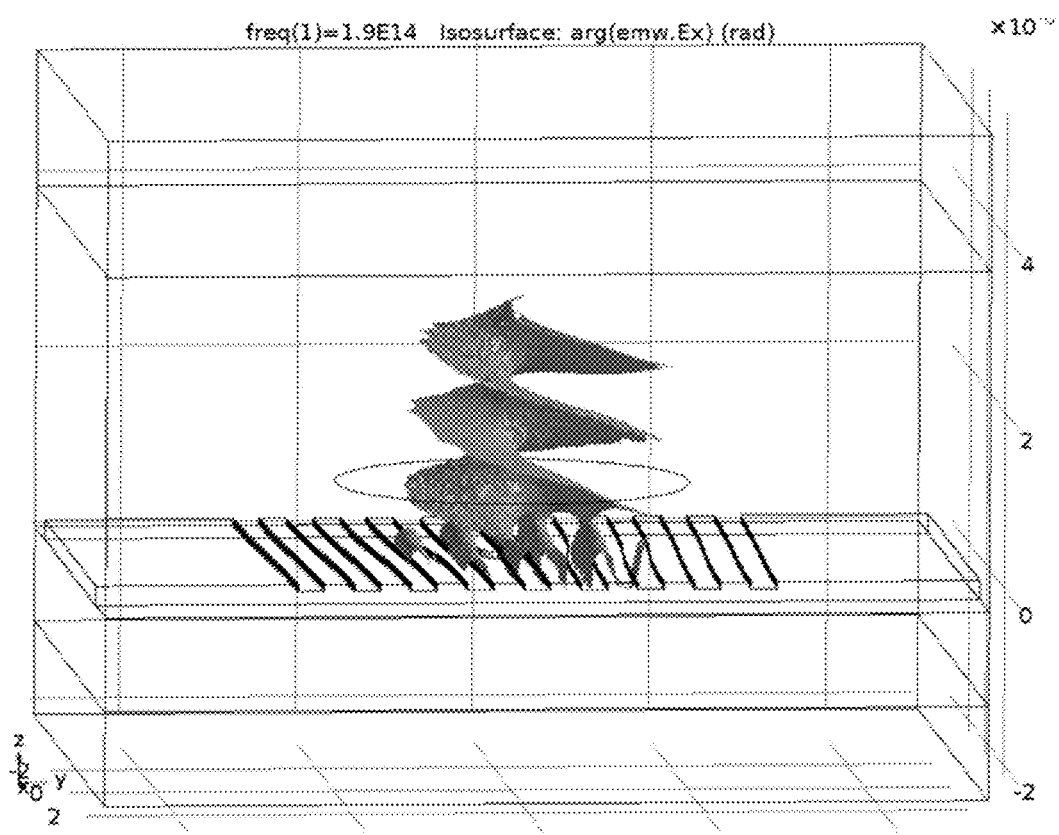
FIG. 9 is a graph of the simulation model results, in accordance with an embodiment.

The contour plot of the phase=0 surface in Ex over a beam aligned cylindrical region over the center of the grating shown in FIG. 9 dramatically illustrates the vortex nature of the beam emitted. The surface is shown only within a 3 um diameter cylinder aligned with the beam.

Although the present invention has been described in connection with a preferred embodiment, it should be understood that modifications, alterations, and additions can be made to the invention without departing from the scope of the invention as defined by the claims.

What is claimed is:

1. An optical coupler configured to couple an incident optical vortex light beam to or from a waveguide mode, the optical coupler comprising:
   a forked grating structure configured to receive the optical vortex light beam, wherein the forked grating structure comprises at least one forked region and a plurality of grooves, and further wherein the at least one forked region is positioned amidst the plurality of grooves;
   an optical waveguide; and
   a tapered portion connecting the forked grating structure and the optical waveguide.

2. The optical coupler of claim 1, wherein the optical vortex light beam is in free space.

3. The optical coupler of claim 1, wherein the optical vortex light beam is received from an optic.

4. The optical coupler of claim 1, wherein the optical vortex light beam is received from an optical fiber.

5. The optical coupler of claim 1, wherein the plurality of grooves comprise a constant width.

6. The optical coupler of claim 1, wherein at least some of the plurality of grooves are segmented.

7. The optical coupler of claim 1, wherein the coupler comprises at least two optical waveguides and at least two tapered portions.

8. The optical coupler of claim 1, further comprising a reflector.

9. The optical coupler of claim 1, wherein the at least one forked region is coated.

10. An optical coupling system configured to couple an incident optical vortex light beam to or from a waveguide mode, the system comprising:
    an optical coupler comprising: (i) a forked grating structure configured to receive the optical vortex light beam, wherein the forked grating structure comprises at least one forked region and a plurality of grooves, and further wherein the at least one forked region is positioned amidst the plurality of grooves; (ii) an optical waveguide; and (iii) a tapered portion connecting the forked grating structure and the optical waveguide; and
    a photonic integrated circuit configured to receive light from the optical coupler.

11. The optical coupling system of claim 10, further comprising an optic configured to provide the light beam to the optical coupler.

12. The optical coupling system of claim 10, further comprising an optical fiber configured to provide the light beam to the optical coupler.

13. The optical coupling system of claim 10, wherein the plurality of grooves comprise a constant width.

14. The optical coupling system of claim 10, wherein at least some of the plurality of grooves are segmented.

15. The optical coupling system of claim 10, wherein the coupler comprises at least two optical waveguides and at least two tapered portions.

16. The optical coupling system of claim 10, wherein the at least one forked region is coated.

* * * * *